2,835,666
WATER-SOLUBLE THERMOPLASTIC CELLULOSE ETHER

Albert B. Savage, Midland, Mich., assignor to The Dow Chemical Company, Midland, Mich., a corporation of Delaware No Drawing. Application May 27, 1954
Serial No. 432,922

3 Claims. (Cl. 260—231)

This invention relates to new cellulose ethers which are soluble in water and which are also significantly thermoplastic.

It is well known that the alkyl ethers of cellulose exhibit varying solubility characteristics, according to the degree to which the cellulose has been etherified. Thus, in the case of methyl cellulose, the presence of much less than 1.5 methoxyl groups per $C_6$-unit is associated with products which are soluble only in aqueous alkali, while 1.5 to 2.4 methoxyl groups per $C_6$-unit identify a methyl cellulose which is soluble in water but not in organic solvents, and 2.5 to 3 methoxyl groups are found in a methyl cellulose which is not soluble in water or in aqueous alkali but is soluble in such solvents as 70:30 benzene:methanol mixture. The water-soluble and the alkali-soluble methyl celluloses are not thermoplastic, and the only thermoplastic methyl cellulose is one which is so fully etherified that it has no solubility in aqueous media. The same variations are found in the properties of ethyl cellulose, and the water-soluble forms of ethyl cellulose are not thermoplastic, while the thermoplastic forms are not water-soluble. It is true, as well, that the water-soluble forms of other cellulose ethers, including carboxymethyl cellulose and hydroxyethyl and hydroxypropyl cellulose, are not thermoplastic.

There are fields of use for which water-soluble cellulose ethers would appear to be well suited because of their water-solubility, but in which they have found limited application because of their lack of thermoplasticity. One such is the manufacture of rigid or semi-rigid capsules for medicinals. So long as these must be made from aqueous solutions of the cellulose ether, no great advantage is seen by the manufacturer over the corresponding practice of making rigid capsules from aqueous dispersions of gelatine. If, however, a non-toxic, water-soluble cellulose ether were sufficiently thermoplastic to be formed by injection molding, or by extrusion and pressing, or other heat fabrication procedures, a marked economy could be effected, and a more uniform product obtained. In the rigid capsule field, it is considered undesirable to have more than minor amounts of a humectant in the capsule composition, and the large amounts of plasticizers which are required to render a normally non-thermoplastic water-soluble cellulose ether responsive to heat and pressure must be avoided. Hence, the desired product should be thermoplastic without the aid of plasticizers.

It is the principal object of this invention to provide a thermoplastic, water-soluble cellulose ether, and a method of making it. A specific object is to provide a water-soluble thermoplastic hydroxybutyl methyl cellulose. Other objects may appear hereinafter.

The water-soluble thermoplastic cellulose ether of this invention is a hydroxybutyl methyl cellulose which may be prepared by a particular process to be described herein.

The new cellulose ethers are made by reaction between an alkali cellulose having an alkali (NaOH) to cellulose ratio, by weight, of from 0.7 to 1.5 and a water to cellulose ratio in about the same range, i. e., the alkali metal hydroxide solution used in making the alkali cellulose may be one of from 30 to 60 percent strength, but is preferably in the range from 45 to 55 percent strength, by weight. The alkali cellulose is mixed with from 0.15 to 0.8 part by weight of butylene oxide per part of cellulose and the mixture is caused to react. Preferred reaction temperatures are not greatly in excess of 40° C. Thereafter, the product of this reaction is heated with from 1.1 to 2.0 parts by weight of methyl chloride per part of cellulose at a temperature of at least 40° C., preferably not above 80° C., until etherification is substantially complete. The etherifying agents may both be present at the start of the reaction, or the etherification may be effected at the lower temperature in the absence of methyl chloride, and the latter reagent may then be added when most of the olefin oxide has reacted.

The new products have considerable thermoplasticity, melting at least 10° C. and as much as 40° C. or more below their decomposition temperatures when tested on a melting point bar. In addition, the ethers are water-soluble and are also soluble in some methanol/water solutions.

The following examples illustrate the preparation of the new ethers, and show the thermoplastic properties of these and other water-soluble ethers of cellulose.

EXAMPLE 1

Cotton linters pulp was dipped in 50 percent aqueous NaOH and the excess wiped out to leave a ratio of NaOH/cellulose of 0.97 in the alkali cellulose. The alkali cellulose was then placed in a rotating pressure vessel and butylene oxide and methyl chloride added to give ratios of butylene oxide/cellulose=0.25 and methyl chloride/cellulose=1.60. The reactor was heated at 40° C. for 2 hours, then the temperature was raised according to the following schedule: 2 hours at 53° C., and 3.5 hours at 75° C. At the end of this period the reaction was substantially complete. The material was washed with hot water to remove impurities and dried.

The viscosity of a 2 percent water solution at 25° C. was 608 cps. The softening point of the product was 278° C., the melting point 281° C., and the decomposition temperature was 300° C.

By way of contrast, when the above preparation was repeated using a butylene oxide/cellulose ratio of 0.10, the resulting product had a melting point of 297° C. and a decomposition temperature of 307° C. A water-soluble methyl cellulose decomposed without melting at 293° C.

The hydroxybutyl cellulose ethers of this invention show a remarkable solubility in propylene glycol compared to the other water-soluble cellulose ethers of commerce. This is shown in Table I wherein hyroxybutyl methyl cellulose, hydroxypropyl methyl cellulose, and methyl cellulose were dissolved in propylene glycol. Each of the ethers chosen had a viscosity of 50 cps. when measured from a 2 percent aqueous solution at 25° C.

*Table I*

|  | Solubility (percent) in propylene glycol at 140° C. |
|---|---|
| Hydroxybutyl methyl cellulose | 40.2 |
| Hydroxypropyl methyl cellulose | 19.4 |
| Methyl cellulose | 15.9 |

Films were cast from the 40.2 percent propylene glycol solution and found to be very tough. Such concenetrated solutions are particularly advantageous when rigid capsules are to be prepared.

I claim:
1. The process which comprises subjecting an alkali cellulose initially having an alkali to cellulose ratio of from 0.7 to 1.5 to the action of from 0.15 to 0.8 part of butylene oxide per part of cellulose, until the olefin oxide is substantially fully reacted, and to the action of from 1.1 to 2.0 parts of methyl chloride per part of cellulose at a temperature from 40° C. to 80° C. until the etherification is substantially complete, to produce a hydroxybutyl methyl cellulose which is both cold water-soluble and thermoplastic.

2. The process claimed in claim 1, wherein both etherifying agents are present at the start of the etherification reaction.

3. The process claimed in claim 1, wherein the methyl chloride is not added until the reaction with the butylene oxide is substantially complete.

References Cited in the file of this patent
UNITED STATES PATENTS

| | | |
|---|---|---|
| 1,877,856 | Hagedorn et al. | Sept. 20, 1932 |
| 2,033,126 | Dreyfus | Mar. 10, 1936 |
| 2,388,764 | Reichel et al. | Nov. 13, 1945 |
| 2,526,683 | Murphy | Oct. 24, 1950 |
| 2,602,755 | Silvernail | July 8, 1952 |
| 2,610,180 | Klug | Sept. 9, 1952 |
| 2,629,667 | Kaveler | Feb. 24, 1953 |

OTHER REFERENCES

Heuser: Cellulose Chemistry (1947), page 545.